Sept. 27, 1955 — J. R. McINNIS — 2,719,053
AIRFOILS FOR MOTOR VEHICLES
Filed May 2, 1952

INVENTOR
James R. McInnis
BY *(signature)*
ATTORNEY

2,719,053
Patented Sept. 27, 1955

2,719,053

AIRFOILS FOR MOTOR VEHICLES

James R. McInnis, Brunswick, Ga.

Application May 2, 1952, Serial No. 285,617

4 Claims. (Cl. 296—1)

This invention relates to improvements in airfoils for motor vehicles, and more specifically to an airfoil plate designed to be suspended below the chassis of an automotive vehicle adjacent the front end thereof.

One of the objects of this invention is to provide an airfoil for automobiles, trucks, buses and other similar vehicles, which effects a greater road stability for the vehicle when operated at relatively high speeds, whereby the operator's control of the vehicle is improved and the safety of operation thereof is increased.

Another object of this invention resides in the provision of an airfoil for light weight vehicles of the type described which effects therein the smooth riding characteristics of a heavier vehicle.

A still further object of this invention is to provide airfoil means for a vehicle of the type referred to above, the means having a streamlined configuration to effect a reduction of fuel consumption when the vehicle is operated at high speeds.

It is a further object of this invention to provide means suspended between an automotive vehicle body and the road for reducing the drag therebetween at high speeds whereby the efficiency of operation of the vehicle is increased and without impairing the efficiency of the vehicle during operation under normal traffic conditions.

This invention also contemplates the provision of airfoil means for automotive vehicles which is suspended between the vehicle chassis and the road, and so designed as to direct the flow of air impinging thereagainst in a fixed path to take advantage of Bernoulli's theorem which, briefly stated, holds that the greater the velocity of a fluid along a fixed path the less the pressure.

A further object of this invention is to provide means of the type described which is inexpensive to manufacture, noncomplex in construction and assembly, and which is inexpensive to maintain.

Other and further objects and advantages of this invention will become manifest from a consideration of the following specification when read in the light of the appended drawings, in which.

Figure 1:
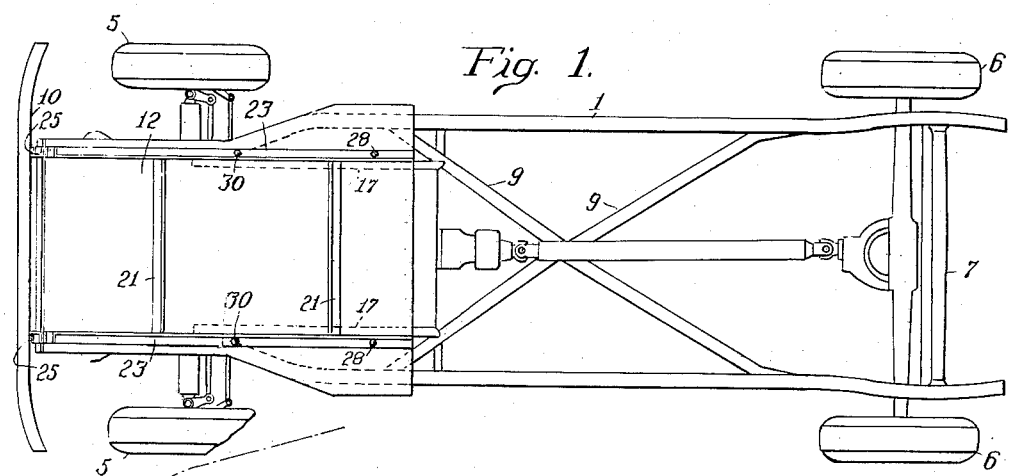
Fig. 1 is a bottom plan view of a vehicle chassis and illustrating the position relative thereto of an airfoil constructed according to the teachings of this invention.
Figure 2:
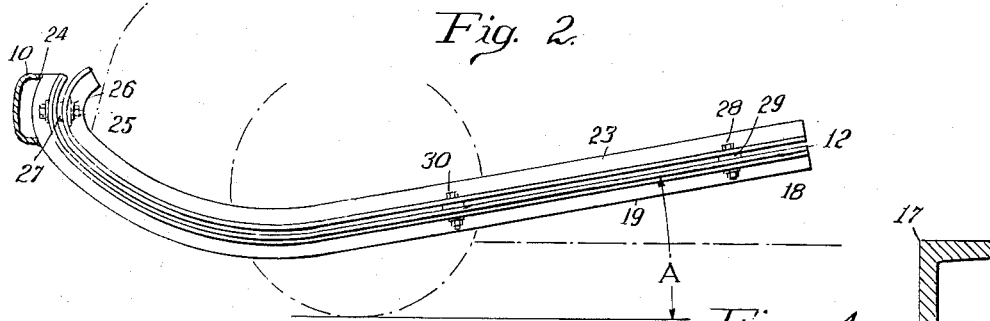
Fig. 2 is a side elevation of the airfoil attachment showing a portion of the vehicle in dotted lines.
Figure 4:
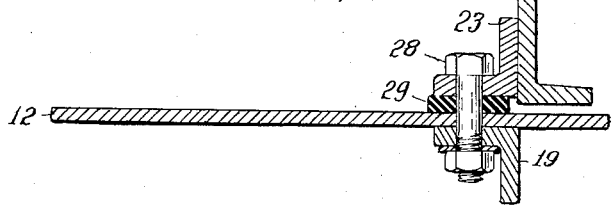
Fig. 4 is a cross section through the rear connection of the airfoil with the chassis.

Referring now more specifically to the drawings, the invention is shown applied to a chassis of conventional construction of an automotive vehicle. The chassis comprises a pair of spaced parallel side frame members having front wheels 5 and rear wheels 6 for the vehicle. Cross braces and spacers 7 extend transversely of the side frame members and are rigidly secured thereto in their customary positions. The chassis 1 is further strengthened and held rigidly by the X-shaped cross brace 9 secured to the side frame members intermediate the ends thereof. A bumper 10 is secured at the front of the chassis frame.

The airfoil 12 to which this invention relates is shown in inverted plan view in Fig. 1 and is formed of an elongated sheet of metal or other material substantially rectangular or other suitable shape in plan. The airfoil 12 extends transversely across beneath the chassis frame substantially from side to side thereof.

A second pair of angle members 23 are mounted on the opposite side of the airfoil 12 and are arranged respectively in opposed relation to the angle members 19 at or adjacent each opposite edge of the airfoil 12, extending lengthwise of the latter and forming braces therefor holding the airfoil securely in rigid relation. Each pair of the brace members 19 and 23 may be provided with cross braces if desired or needed, as indicated at 21, or these cross braces may be omitted. Any suitable frame structure which will hold the airfoil securely in place may be used for this purpose or if the airfoil plate be sufficiently strong and rigid to be self-sustaining, the braces and frame structure may be omitted.

At the front end, the airfoil is mounted on the chassis by connection with the front bumper 10 in any suitable or desired manner such as welded connections 24 between the angle members 19 and the bumper 10, or other suitable fastening means may be substituted for the welded connections or supplement the latter to anchor the front end portion of the airfoil 12 securely to the chassis of the vehicle.

Figure 3:
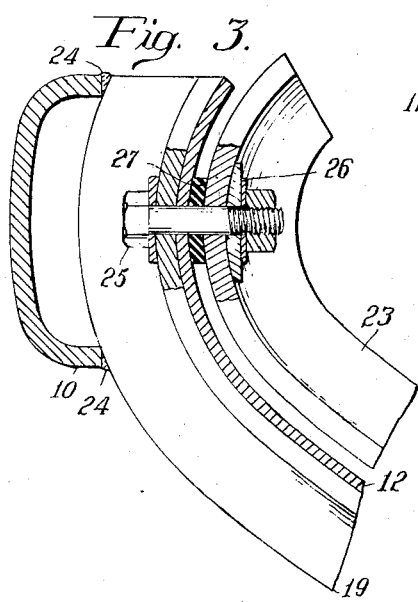
Fig. 3 is a partial sectional view of the front end connection of the airfoil with the bumper assembly.

The airfoil 12 is secured to the angle members 19 and 23 at spaced points along the length of the airfoil by suitable fastenings or tie bolts extending therethrough. A pair of tie bolts are shown at 25 extending through opposed flanges of the angle members 19 and 23 at the front end of the airfoil as illustrated in Fig. 3, and securely locked in place as by a lock washer 26. A bushing is shown at 27 surrounding each bolt 25 and preferably formed of soft rubber which will act as a spring vibration absorbing member, bearing against one side of the airfoil plate 12 between the latter and one of the angle members 19 or 23.

The rear end portion of the airfoil 12 is anchored to any suitable part of the chassis frame by welding, riveting, bolting or otherwise fastening the airfoil plate or the angle members thereto. In the assembly illustrated, the angle members 19 and 23 are arranged substantially in adjacent positions to chassis frame portions 17 and the angle members 23 are fastened thereto as described above, such as by welding. Tie bolts 28 are used then to connect the angle members 19 and 23 together with the airfoil 12 interposed therebetween and secured by the tie bolts, being held in place by resilient bushings 29, as described above.

Figure 5:
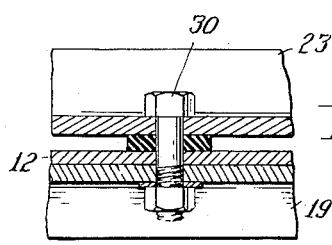
Fig. 5 is a detail section of a tie bolt connection.

Additional tie bolts may be used at intermediate points along the length of the opposed pairs of angle members as indicated generally at 30, as shown in Fig. 5, these being constructed and used substantially in the same manner as the tie bolts 25 and 28 described above.

Having described the invention in detail the use thereof will now be explained:

During operation of the vehicle at relatively high speeds the air stream impinges against the leading end of the airfoil 12. The airfoil 12 extends from the bumper 10 to the chassis for a distance equal to substantially forty percent of the total overall vehicle length; and being suspended therefrom the airfoil 12 spans many of the component elements of the vehicle which would normally fall within the air stream introducing a high degree of drag. Thus the streamlined airfoil 12 eliminates this drag and simultaneously causes the air stream to flow along a fixed smooth path. After leaving the leading end the air stream passes over the trailing end 18 which presents a negative angle A of attack of approximately 11°. This effects a reduction of pressure, according to Bernoulli's theorem. The reduction of pressure between the airfoil 12 and the road is the equivalent of increasing the vertical downward pressure of the vehicle on the road without increasing the load, and thereby provides better road stability; and in the case of light weight vehicles, the airfoil provides the smooth riding characteristics of a heavy car. The reduction of drag results in a saving of fuel.

With the introduction of the airfoil 12 no interference in the operation or efficiency of the vehicle arises under normal city traffic conditions.

The construction details of this invention and the operation thereof having been specifically and completely set forth, it will be understood that the instant embodiment thereof is offered by way of example, and that the invention is to be limited only by the scope of the following claims.

I claim:

1. An article of manufacture comprising an airfoil for a land vehicle having a chassis, said airfoil being formed of a sheet of material having an upwardly curved convex leading end merging with an upwardly inclined trailing end, and means for connecting said airfoil to the chassis substantially below the latter, said means comprising a pair of bars extending lengthwise of the sheet substantially throughout the length thereof and longitudinally curved to correspond with the curvature of the sheet, said bars being mounted adjacent each opposite edge of the sheet and on opposite sides thereof, and means for securing the sheet and the bars together, one of said bars adjacent each edge of the sheet being secured to the chassis.

2. An article of manufacture comprising an airfoil for a land vehicle having a chassis, said airfoil being formed of a sheet of material having an upwardly curved convex leading end merging with an upwardly inclined trailing end, and means for connecting said airfoil to the chassis substantially below the latter, said means comprising a pair of bars extending lengthwise of the sheet substantially throughout the length thereof and longitudinally curved to correspond with the curvature of the sheet, said bars being mounted adjacent each opposite edge of the sheet and on opposite sides thereof, bolts extending through the bars of each pair and the sheet and securing said parts together, one of said bars adjacent each edge of the sheet being secured to the chassis, and resilient bushings sleeved over the bolts between the sheet and the last-mentioned bars for absorbing vibration therebetween.

3. In a motor vehicle having a chassis including a chassis frame, of an airfoil extending beneath the chassis, said airfoil being formed of a sheet of material having an upwardly curved convex leading end merging with an upwardly inclined trailing end, and means for connecting said airfoil to the chassis frame, said means comprising a pair of bars extending lengthwise of the sheet substantially throughout the length thereof and longitudinally curved to correspond with the curvature of the sheet, said bars being mounted at each opposite edge of the sheet and on opposite sides thereof, one of said bars at each edge of the sheet being secured to the chassis frame, means for securing the sheet and the bars together, and a transverse bumper at the forward end of the chassis secured to the upwardly extending front end portion of the other bar of each pair.

4. In a motor vehicle having a chassis including a chassis frame with transversely spaced frame members, of an airfoil extending beneath the chassis, said airfoil being formed of a sheet of material having an upwardly curved convex leading end merging with an upwardly inclined trailing end, and means for connecting said airfoil to the chassis frame, said means comprising a bar extending lengthwise of the sheet at the upper side thereof adjacent and spaced from each opposite edge thereof and substantially throughout the length thereof, said bar being longitudinally curved to correspond with the curvature of the sheet, said sheet extending outwardly beyond the bar at each edge and beneath the adjacent chassis frame member, and fastening members extending through the sheet and the bars and securing the same together.

References Cited in the file of this patent

UNITED STATES PATENTS

| | | |
|---|---|---|
| D. 85,298 | Montgomery | Oct. 6, 1931 |
| D. 117,636 | Lewis | Nov. 14, 1939 |
| 1,868,382 | Coadou | July 19, 1932 |
| 2,118,127 | Wulle | May 24, 1938 |
| 2,128,686 | Andreau | Aug. 30, 1938 |
| 2,236,670 | Cadwallader et al. | Apr. 1, 1941 |
| 2,260,578 | Murray | Oct. 28, 1941 |

FOREIGN PATENTS

| | | |
|---|---|---|
| 701,538 | Germany | Jan. 18, 1941 |
| 463,620 | Great Britain | Mar. 30, 1937 |